Patented May 29, 1934

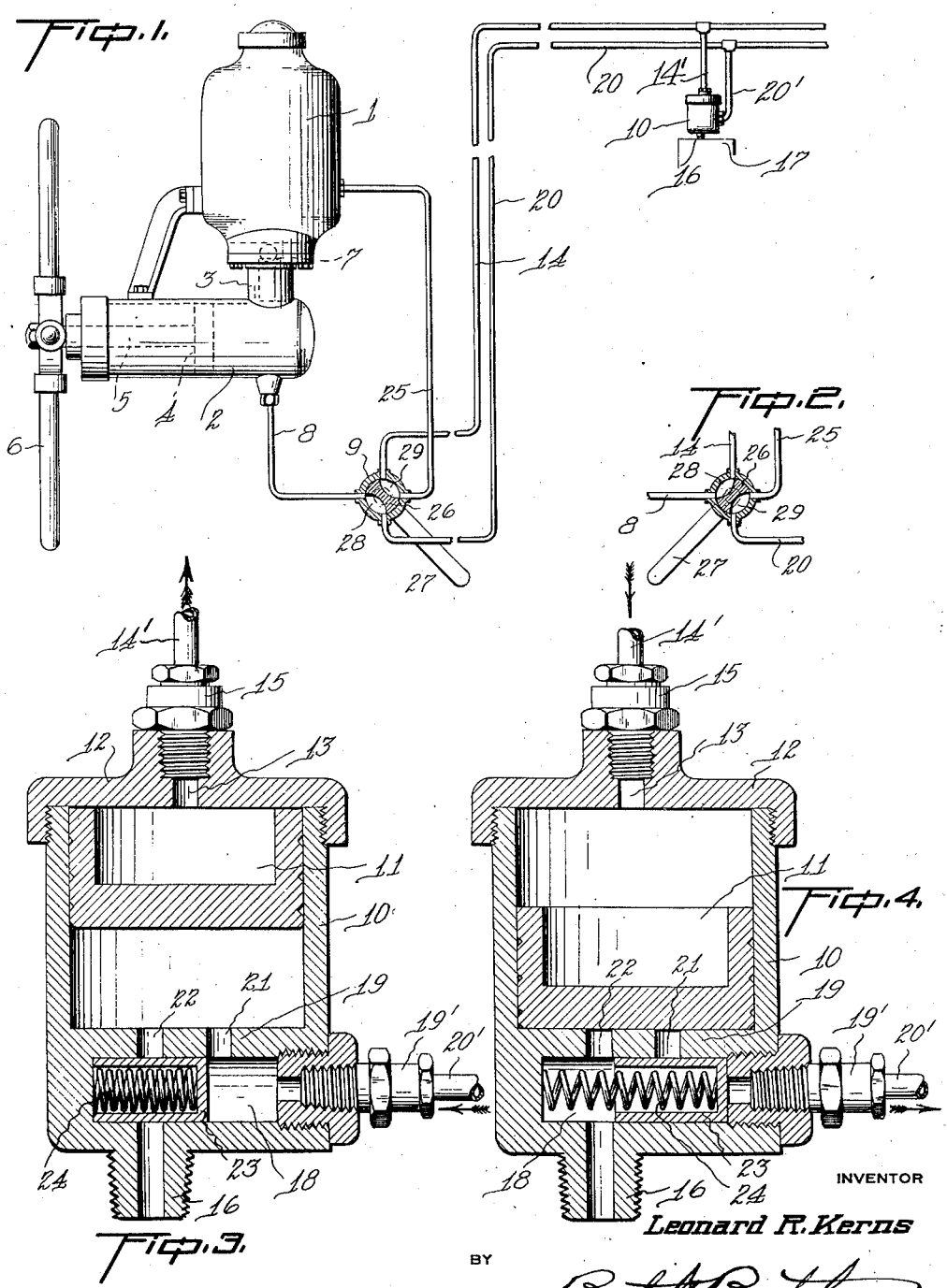

1,961,051

UNITED STATES PATENT OFFICE 1,961,051

LUBRICATING DEVICE

Leonard R. Kerns, Chicago, Ill., assignor, by mesne assignments, to The Farval Corporation, Cleveland, Ohio, a corporation of Ohio Application February 23, 1929, Serial No. 341,958

9 Claims. (Cl. 184—7)

The present invention pertains to a novel lubricating device designed for use in centralized lubricating systems, wherein a plurality of points may be lubricated in a single operation, as shown in my copending application, Serial No. 341,957 of even filing date.

The invention is directed more particularly to the means for charging lubricant under pressure into the line leading to the various points to be lubricated.

This device includes a lubricant reservoir communicating with a grease gun in which the pressure is developed. By means of a unique pump and valve system, the pressure developed in the grease gun is first utilized to fill the pump and then to exert pressure within the pump whereby the charge of lubricant therein is delivered to the line.

The invention is fully disclosed by way of example in the following description and in the accompanying drawing, in which—

Figure 1 is an elevation of the apparatus showing the control valve in section;

Fig. 2 is a cross section of the valve in a different position;

Fig. 3 is a section of the pump in loading position; and

Fig. 4 is a similar section of the pump in discharged position.

Reference to these views will now be made by use of like characters which are employed to designate corresponding parts throughout.

In Figure 1 the apparatus is illustrated as including a reservoir 1 for containing a quantity of lubricant and communicating with the cylinder 2 of a grease gun through a neck 3. A piston 4 is slidably mounted in the grease gun and is operated by a threaded piston rod 5 and an exterior handle 6. Between the cylinder 2 and the reservoir 1 is a check valve device 7 which opens by gravity to permit the chamber of the gun to fill and closes by the pressure developed in the cylinder 2 when the piston 4 is moved inwardly.

During such operation of the grease gun, the lubricant thus trapped in the chamber is delivered to a pipe 8 communicating with a valve casing 9 in a manner which will presently be described in full.

The system also includes a pump comprising a body 10 having a piston 11 slidably mounted therein. The upper end of the body is closed by a cap 12 in which is formed a pressure opening 13, so called because it admits and relieves the pressure controlling the operation of the piston 11. A line 14 extends from the valve casing 9 and is branched at 14 and connected to the passage 13 by means of a fitting 15. The lower end of the body 10 is formed as a screwthreaded nipple 16 inserted in the bearing or other member 17 to be lubricated. It will be understood that a pump of this character is applied to each bearing in the system, and all such pumps have their respective pressure openings connected by branches to the line 14.

Above the nipple 16 the body 10 is formed with a valve chamber 18 separated from the piston chamber by a wall or partition 19. One end of the valve chamber is closed and the other end is joined by fittings 19' and a branch 20' to another line 20 entering the valve casing 9 as clearly shown in Figures 1 and 2. The line 20 is common to the several pump units comprised in the system and is connected to them by branches similar to the branch 20'.

The partition 19 has a loading opening 21 establishing communication from the branch 20' through the chamber 18 to the piston chamber. There is also a discharge opening 22 in the partition 19 establishing communication between the piston chamber and the valve chamber and thence to the nipple 16. The valve chamber 18 contains a sliding valve 23 adapted in one position to close the port 22 and open the port 21 and in another position to open the port 22 and close the port 21 as illustrated in Figures 3 and 4 respectively. A spring 24 contained within the valve 23 and engaging the blind end of the valve chamber normally tends to move the valve to the latter position.

Still another line 25 connects the valve casing 9 to the reservoir 1. The valve casing contains a valve plug 26 operable by an external handle 27 and having a pair of passages 28 and 29 cut therein. In one position of the valve, as shown in Figure 1, the passage 28 connects the pipes 8 and 20, or in other words, brings the grease gun into communication with the loading port 21; while the passage 29 connects the lines 14 and 25 and brings the pressure opening 13 into communication with the reservoir. In another position of the valve, as shown in Figure 2, the lines 8 and 14 are connected by the passage 28 so that the grease gun communicates with the pressure opening 13; and the passage 29 connects the pipes 20 and 25.

In the operation of the device, assuming that the parts are in the position shown in Figure 1, the piston 4 is first moved into the cylinder 2, whereupon the check valve 7 closes and lubricant is forced through the lines 8 and 20 into the valve chamber 18 and through the passage 21 to the piston chamber within the body 10. This pressure must be at least sufficient to compress the spring 24 in order that the valve 23 will be moved to the position shown in Figure 3 to uncover the port 21. The piston 11 is thereby raised, and any lubricant that may be contained above it, such as the residue of a previous operation, is expelled, the lines 14 and 25 and the reservoir 1 receiving the displaced lubricant. The pressure on the piston 4 is now relieved sufficiently to permit the spring 24 to move the valve 23 to the position shown in Figure 4 where it closes the port 21 and uncovers the port 22, the handle being moved reversely for the purpose. The valve plug 26 is now turned to the position shown in Figure 2, already described, and pressure is again built up in the cylinder 2 by moving the piston 4 inwardly. Lubricant is thus delivered from the gun into the line 14 and pressure opening 13 to depress the piston 11, as shown in Figure 4, to discharge the lubricant, previously loaded into the pump, through the discharge opening 22, chamber 18 and nipple 16 into the bearing.

The discharging pressure on the lubricant firmly holds the valve 23 against the open end of the valve chamber to prevent return of lubricant from the piston chamber into the line 20. The small quantity of lubricant displaced by the movement of the valve 23 towards the fittings 19' is permitted to back up in the lines 20 and 25 to the reservoir 1. When the body 10 has been completely emptied, the operator can feel this condition by the cushioning of the piston 4 against lubricant trapped above the piston 11. He then reverses the piston 4 sufficiently to relieve the pressure in the chamber 18 so that on the next operation the spring 24 will readily be compressed by movement of the valve 23.

As will be understood, the feed conduits 14 and 20, the pressure means for delivering lubricant therethrough, and the connection of the feed lines with the piston cylinder on opposite sides of the piston are so related in operation through the control means 9, that when pressure is being applied on one of the feed lines, it moves the piston to discharge chamber contents from the opposite side of the piston, the particular side discharged depending upon which feed line is receiving the delivery pressure. In the particular embodiment shown, the chamber contents of the upper side of the piston, when discharged, are returned to the feed line through which the lubricant had entered, the arrangement of the lines being such that at such time the supply source is in open communication with such line, so that the resistance to return of lubricant is at its low point. In other words, the arrangement provides for a dual application of pressure to act in moving the lubricant, thus placing the usual pressure means that is active to discharge lubricant to the point of lubrication available for service in moving parts of the valve structure in which such movement can be most efficiently had by displacing lubricant in the direction of the feed line from which it was received, as indicated, for instance, by the return movement of the piston from the position of Fig. 4. Since the pressure means is capable of heavy duty conditions to move the piston from the position of Fig. 3 during delivery of lubricant to the point of lubrication, it is obviously capable of providing the power needed to displace the lubricant and return it to the line when the operation requires that this be done. Springs for doing this have been utilized, but where the duty is heavy they may be unable to provide rapid movement of parts, especially where the volume to be displaced is large. By setting up a differential in pressure between the two lines—as is done in the present instance by the use of the valve 9—the pressure means can be made active as the basis of all actions of the piston, and, through its application to a particular line becomes active in the movement of other moving parts, such as the valve 23; in other words, control of the application of the pressure means carries such control to each of the valve structures which may be present in the system.

Although a specific embodiment of the invention has been illustrated and described, it will be understood that various alterations in the details of construction may be made without departing from the scope of the invention, as indicated by the appended claims.

What I claim is:—

1. A lubricating device comprising a reservoir, a gun in communication therewith, a pump including a body and a piston reciprocable therein, said body having a loading opening and a discharge opening at one side of the piston and a pressure opening at the other side, said piston being movable towards said loading and discharge openings by pressure in said pressure opening, means for selectively connecting said gun to said loading and pressure openings, and means for obstructing said loading opening by relief of loading pressure therein and for obstructing said discharge opening by pressure in the loading opening.

2. A lubricating device comprising a reservoir, a gun in communication therewith, a pump including a body and a piston reciprocable therein, said body having a loading opening and a discharge opening at one side of the piston and a pressure opening at the other side, said piston being movable towards said loading and discharge openings by pressure in said pressure opening, means for selectively connecting said gun to said loading and pressure openings, a slide valve adapted to close said discharge opening by pressure in said loading opening, and a spring adapted to move said valve to a position closing said loading opening and uncovering said discharge opening on relief of pressure in said loading opening.

3. A lubricating device comprising a reservoir, a gun in communication therewith, a pump including a body and a piston reciprocable therein, said body having a loading opening and a discharge opening at one side of the piston and a pressure opening at the other side, said piston being movable towards said loading and discharge openings by pressure in said pressure opening, a valve adapted to connect said gun to said loading opening and connect said pressure opening to said reservoir in one position and to connect said gun to said pressure opening in another position, and means for obstructing said loading opening by relief of loading pressure therein and for obstructing said discharge opening by pressure in the loading opening.

4. A lubricating device comprising a reservoir, a gun in communication therewith, a pump including a body and a piston reciprocable therein, said body having a loading opening and a discharge opening at one side of the piston and a pressure opening at the other side, said piston being movable towards said loading and discharge openings by pressure in said pressure opening, a valve adapted to connect said gun to said loading opening and connect said pressure opening to said reservoir in one position and to connect said gun to said pressure opening in another position, a slide valve adapted to close said discharge opening by pressure in said loading opening, and a spring adapted to move said valve to a position closing said loading opening and uncovering said discharge opening on relief of pressure in said loading opening.

5. A lubricating device comprising a reservoir, a gun in communication therewith, a pump including a body and a piston reciprocable therein, said body having a loading opening and a discharge opening at one side of the piston and a pressure opening at the other side, said piston being movable towards said loading and discharge openings by pressure in said pressure opening, means for selectively connecting said gun to said loading and pressure openings, said body having a valve chamber communicating with said loading and discharge passages, said means for connection to said loading passage including a lubricant delivery device at one end of said valve chamber, a slide valve in said chamber adapted to close said discharge opening and open said loading opening by pressure in said delivery device, and means for moving said valve to a position closing said loading opening and uncovering said discharge opening on relief of pressure in said delivery device.

6. A lubricating device comprising a reservoir, a gun in communication therewith, a pump including a body and a piston reciprocable therein, said body having a loading opening and a discharge opening at one side of the piston and a pressure opening at the other side, said piston being movable towards said loading and discharge openings by pressure in said pressure opening, means for selectively connecting said gun to said loading and pressure openings, said body having a valve chamber communicating with said loading and discharge passages, said means for connection to said loading passage including a lubricant delivery device at one end of said valve chamber, a slide valve in said chamber adapted to close said discharge opening and open said loading opening by pressure in said delivery device, and a spring for moving said valve to a position closing said loading opening and uncovering said discharge opening on relief of pressure in said delivery device.

7. In lubricating systems, a source of lubricant supply, a valve structure for controlling delivery of lubricant to the point of lubrication, a pair of lubricant feed conduits between the lubricant supply and the valve structure, pressure means for delivering lubricant through the conduits, said valve structure including a piston chamber, a piston movable in said chamber, said feed conduits constituting feed lines for the chamber individual to opposite sides of the piston, the pressure means supplying lubricant through one line to move the piston in one direction and to discharge the chamber contents of the opposite side, the similar action of the pressure means for the second line returning the piston to thereby discharge the lubricant previously admitted from the first line, said valve structure having a passage connecting one side of said chamber with the point of lubrication, a shiftable valve subject to feed line pressure for controlling flow through such passage, said valve being operative in the feed line of such side of the chamber to prevent concurrent lubricant flow to such feed line and to the point of lubrication during discharge of the lubricant from such side of the chamber, and means for controlling the flow of lubricant through the lines individually.

8. A system as in claim 7 characterized in that the flow control means for the lines is in the form of an individual control valve operative to limit pressure application to the lines individually and to permit flow toward the supply through the non-pressure line to permit return to the latter line of lubricant necessary to be displaced to enable operation of a movable part of the valve structure.

9. A system as in claim 7 characterized in that the flow control means for the lines is operative to limit pressure application to the lines individually and to permit flow to the supply through the non-pressure line to permit return to the latter line of lubricant necessary to be displaced to enable operation of the piston during delivery to the chamber of lubricant design to be passed to the point of lubrication.

LEONARD R. KERNS.